United States Patent
Penmetsa et al.

(10) Patent No.: US 12,007,762 B2
(45) Date of Patent: Jun. 11, 2024

(54) ADJUSTABLE HEIGHT SENSOR ROOF

(71) Applicant: Zimeno, Inc., Livermore, CA (US)

(72) Inventors: Praveen Varma Penmetsa, Newark, CA (US); Zachary Meyer Omohundro, Hermosa Beach, CA (US); Christopher Travis Whitney, Palo Alto, CA (US); Rama Venkata Surya Kumar Varma Bhupatiraju, Fremont, CA (US); Mizbauddin Mohammed, Fremont, CA (US); Bhargav Ramakrishna Reddy, Fremont, CA (US)

(73) Assignee: Zimeno Inc., Livermore, CA (US)

( * ) Notice: Subject to any disclaimer, the term of this patent is extended or adjusted under 35 U.S.C. 154(b) by 0 days.

(21) Appl. No.: 18/074,966

(22) Filed: Dec. 5, 2022

(65) Prior Publication Data

US 2023/0094055 A1    Mar. 30, 2023

Related U.S. Application Data

(63) Continuation of application No. 17/149,907, filed on Jan. 15, 2021, now Pat. No. 11,543,815, which is a
(Continued)

(51) Int. Cl.
*G05D 1/00* (2006.01)
*B60K 17/28* (2006.01)
(Continued)

(52) U.S. Cl.
CPC .......... *G05D 1/0016* (2013.01); *B60K 17/28* (2013.01); *B60Q 1/44* (2013.01); *B60Q 1/46* (2013.01);
(Continued)

(58) Field of Classification Search
CPC .. G05D 1/0016; G05D 1/0038; G05D 1/0094; G05D 1/0223; G05D 1/0231; G05D 1/0022; G05D 2201/0201; G05D 1/0033; B60K 17/28; B60K 17/18; B60Q 1/44; B60Q 1/46; B60Q 1/50; B60Q 5/001;
(Continued)

(56) References Cited

U.S. PATENT DOCUMENTS 6,377,872 B1   4/2002 Struckman
2015/0308823 A1* 10/2015 Widdowson ............. G01C 5/00
                                                     345/629
(Continued)

FOREIGN PATENT DOCUMENTS

CN   109552155    4/2019
DE   4435222     11/1995
(Continued)

OTHER PUBLICATIONS

PCT International Search Report for PCT/US2021013560 dated Apr. 8, 2021.
(Continued)

*Primary Examiner* — Muhammad Shafi
(74) *Attorney, Agent, or Firm* — Rathe Lindenbaum LLP

(57) ABSTRACT

A vehicle may include a movable roof, a sensor supported by the roof, and an actuator for selectively raising and lowering the roof.

21 Claims, 8 Drawing Sheets

Related U.S. Application Data continuation of application No. 17/114,231, filed on Dec. 7, 2020, now Pat. No. 11,567,492.

(60) Provisional application No. 62/964,583, filed on Jan. 22, 2020, provisional application No. 62/962,752, filed on Jan. 17, 2020.

(51) Int. Cl.

| | |
|---|---|
| *B60Q 1/44* | (2006.01) |
| *B60Q 1/46* | (2006.01) |
| *B60Q 1/50* | (2006.01) |
| *B60Q 5/00* | (2006.01) |
| *B60R 25/23* | (2013.01) |
| *B60R 25/24* | (2013.01) |
| *B60R 25/25* | (2013.01) |
| *G06F 16/40* | (2019.01) |
| *G06N 3/042* | (2023.01) |

(52) U.S. Cl.
CPC ............... *B60Q 1/50* (2013.01); *B60Q 5/001* (2013.01); *B60R 25/23* (2013.01); *B60R 25/24* (2013.01); *B60R 25/25* (2013.01); *G05D 1/0038* (2013.01); *G05D 1/0094* (2013.01); *G05D 1/0223* (2013.01); *G05D 1/0231* (2013.01); *G06F 16/40* (2019.01); *G05D 1/0022* (2013.01); *G06N 3/042* (2023.01)

(58) Field of Classification Search
CPC .... B60Q 1/2611; B60Q 2800/20; B60Q 1/24; B60R 25/23; B60R 25/24; B60R 25/25; G06F 16/40; G06F 21/31; G06N 3/042; B62D 25/06; B62D 49/00; B60Y 2200/221; B60Y 2300/1888
USPC .............................................................. 701/2
See application file for complete search history.

(56) References Cited

U.S. PATENT DOCUMENTS

| | | | |
|---|---|---|---|
| 2017/0248946 A1* | 8/2017 | Ogura | ............... G05D 1/02 |
| 2018/0120863 A1* | 5/2018 | Barra | ............... B60N 2/002 |
| 2018/0251014 A1 | 9/2018 | Baccouche et al. | |
| 2019/0210436 A1 | 7/2019 | Frederick et al. | |
| 2019/0248421 A1 | 8/2019 | Jacobsthal et al. | |
| 2020/0011034 A1 | 1/2020 | Atkinson | |
| 2021/0029872 A1 | 2/2021 | Brandt | |

FOREIGN PATENT DOCUMENTS

| | | | |
|---|---|---|---|
| GB | 2546134 | | 7/2017 |
| JP | H063714 | | 1/1994 |
| JP | H063714 U | * | 6/1994 |
| RU | 2308389 | | 10/2007 |
| WO | WO-2018050348 | * | 3/2018 |
| WO | WO2018050348 | | 3/2018 |

OTHER PUBLICATIONS

Volkswagen, "Polo dimensions", https:/www.vokswagen.co.uk/files/live/sites/vwuk/files/pdf/Brochures/polo-dimensions.pdf (May 15, 2023).
Examination Report dated May 15, 2023 for GB2211887.1.

* cited by examiner

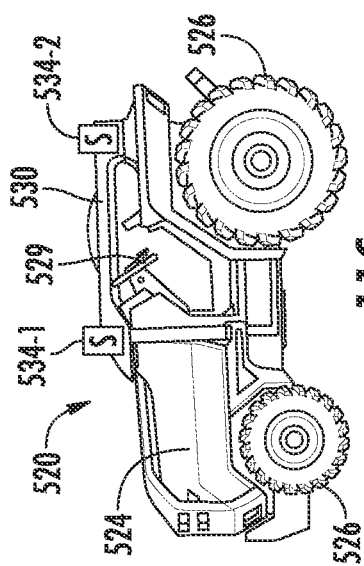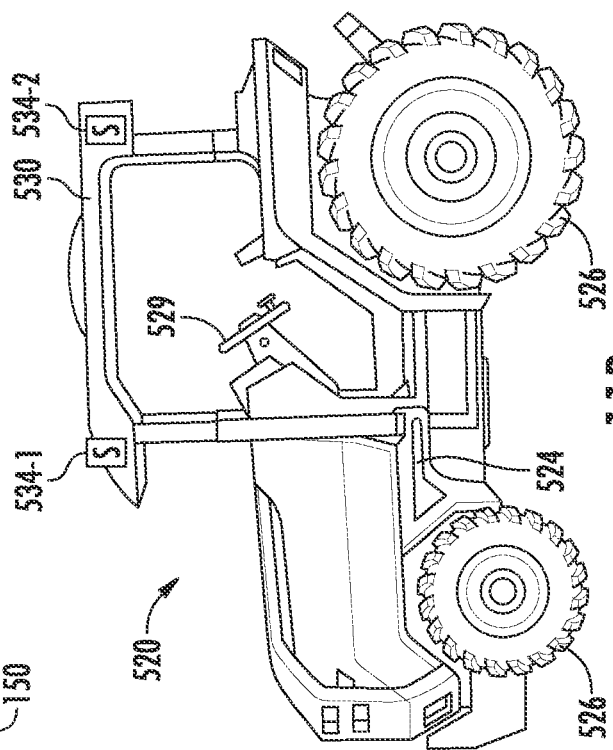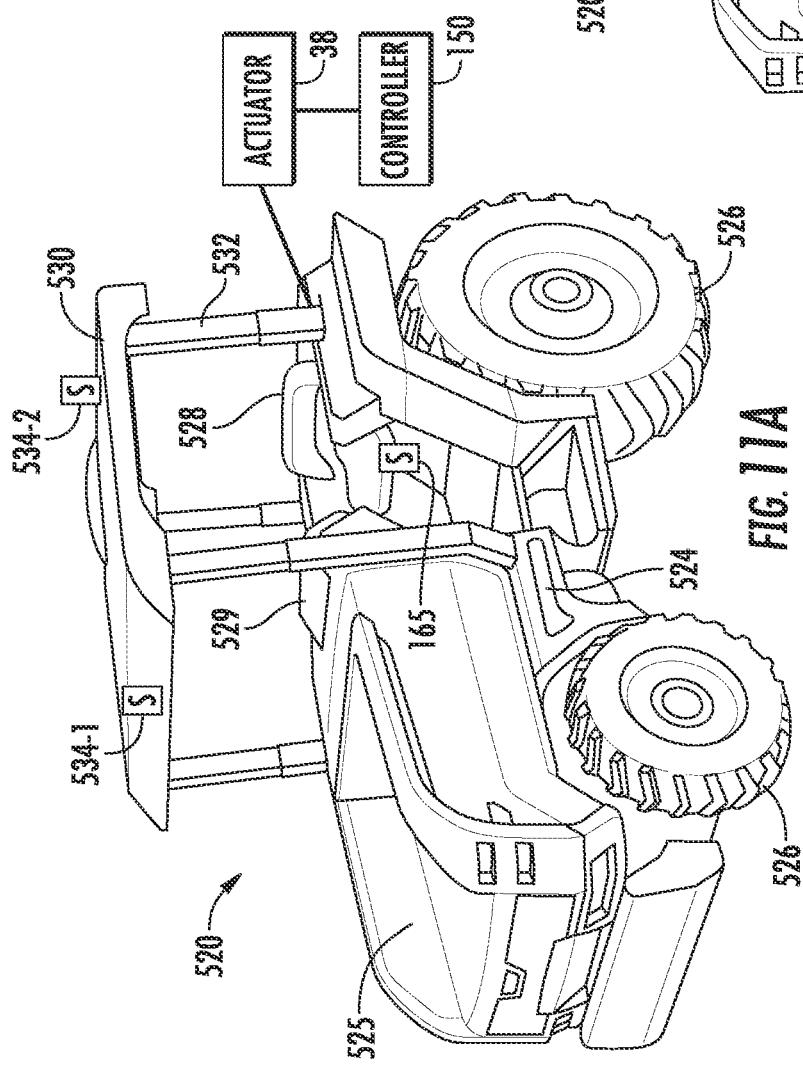

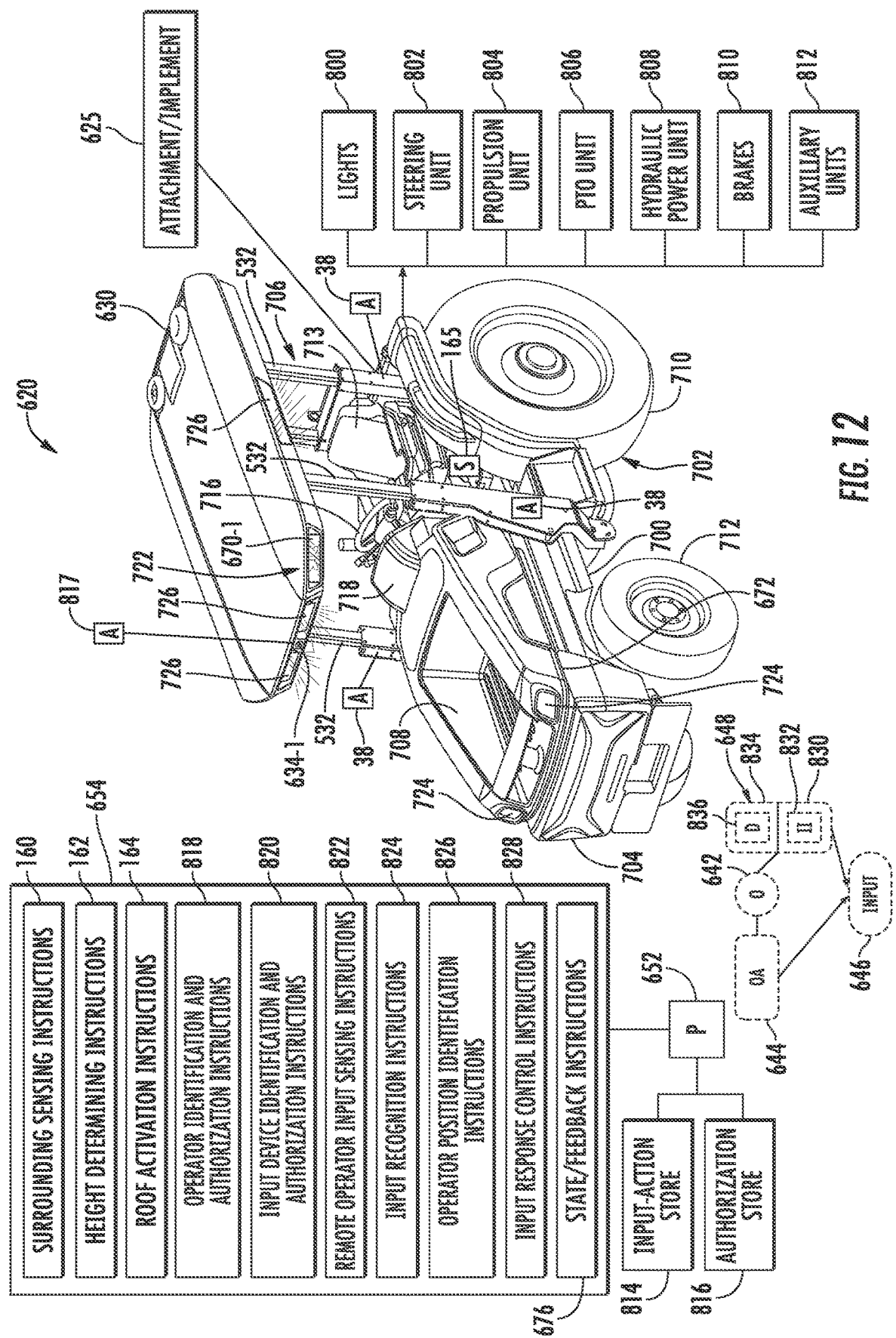

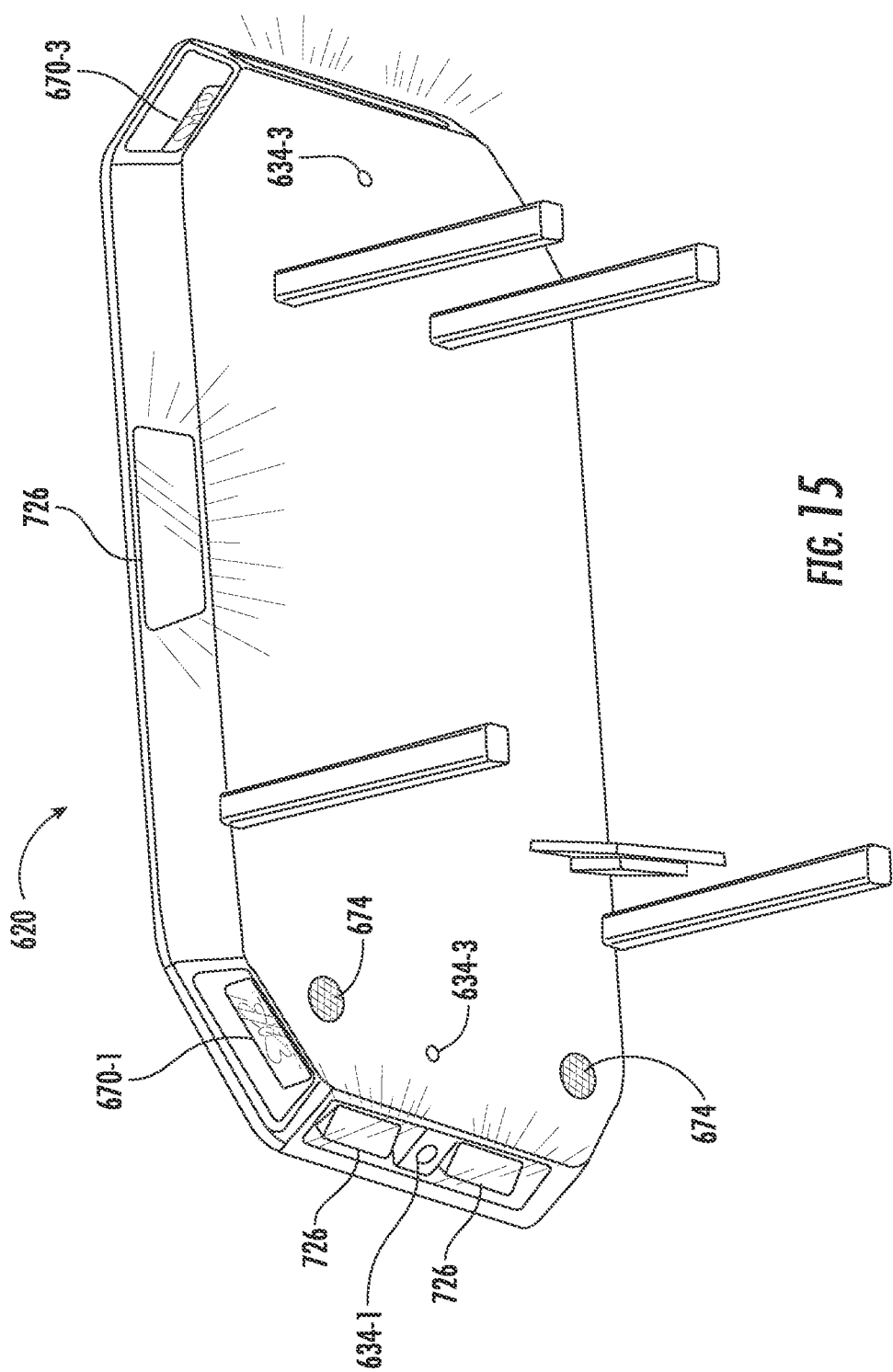

ADJUSTABLE HEIGHT SENSOR ROOF

The present application is a continuation patent application claiming priority under 35 USC § 120 from co-pending U.S. patent application Ser. No. 17/149,907 filed on Jan. 15, 2021, by Penmetsa et al., which claims priority from U.S. provisional patent application Ser. No. 62/964,583 filed on Jan. 22, 2020, by Penmetsa et al. and entitled ADJUSTABLE HEIGHT SENSOR ROOF, the full disclosures of which are hereby incorporated by reference. The present application further claims priority under 35 USC § 120 from co-pending U.S. nonprovisional application Ser. No. 17/114,231 filed on Dec. 7, 2020, by Whitney et al. and entitled VEHICLE CONTROL BY A REMOTE OPERATOR which claims priority under 35 USC § 119 from U.S. provisional patent application Ser. No. 62/962,752 filed on Jan. 17, 2020, the full disclosures each of which are hereby incorporated by reference.

BACKGROUND

Vehicles, such as tractors and the like, often include roofs to protect an operator seated below the roof. Some vehicles additionally include sensors for sensing the surroundings of the vehicle.

BRIEF DESCRIPTION OF THE DRAWINGS

FIG. 11A is a perspective view of an example vehicle having a height adjustable sensor supporting roof in a raised position.

FIG. 11B is a side view of the vehicle of FIG. 11A with the roof in the raised position.

FIG. 11C is a side view of the vehicle of FIG. 11A with the roof in a lowered position.

FIG. 12 is a front perspective view of an example vehicle having a height adjustable sensor supporting roof.

FIG. 15 is a bottom perspective view of the example vehicle of FIG. 14 taken along line 15-15.

Throughout the drawings, identical reference numbers designate similar, but not necessarily identical, elements.

Figure 1A:
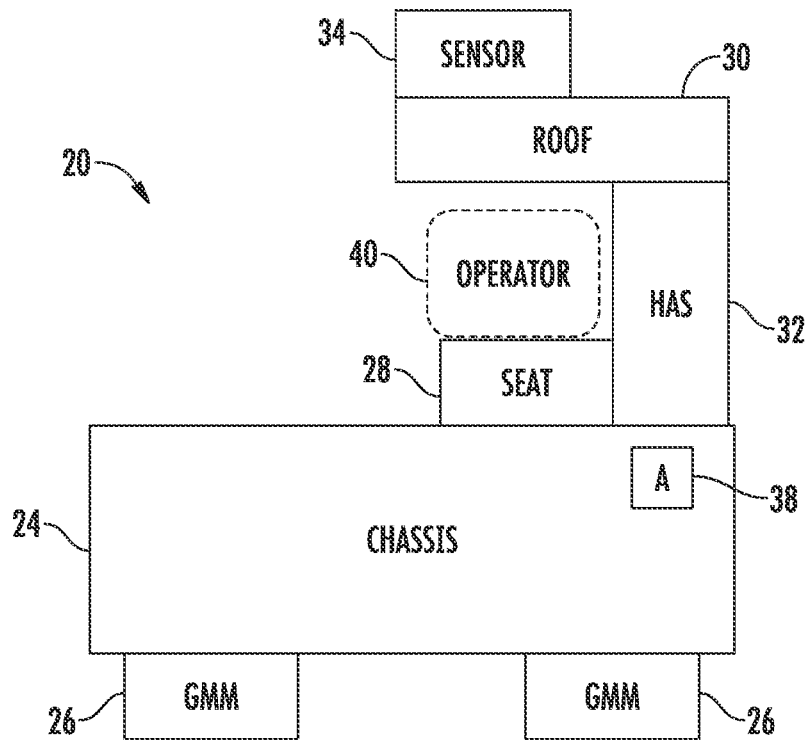
FIGS. 1A and 1B are diagrams schematically illustrating an example vehicle with an adjustable sensor supporting roof at different heights.

The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example actuatable roof control systems, methods and control instructions that facilitate enhanced control over the height of an actuatable roof. The example systems, methods and control instructions facilitate the automatic height adjustment of an actuatable roof based upon signals from sensors carried or supported by the roof. The example systems, methods and controls instructions may facilitate enhanced performance by the sensors by automatically adjusting the height of the roof that supports the sensors based upon the sensed performance of the sensors (which may include the quality of the data acquired by such sensors) at individual heights. Such adjustment may be based upon the height of surrounding foliage or surrounding crops.

The example systems, methods and control instructions may facilitate lower cost transport and storage of the vehicle by automatically lowering the height of the roof in response to forthcoming obstructions, the sensed positioning of the vehicle on a trailer, the sensed towing of the vehicle or the sensed height of a storage facility opening or interior.

Disclosed is an example vehicle which may comprise a chassis, ground motive members supporting the chassis, a seat, a roof above the seat, a height adjustable support supporting the roof, a sensor supported by the roof, and an actuator for selectively raising and lowering the roof.

Disclosed is an example roof control method that may comprise sensing surroundings of a vehicle with a sensor supported by a roof of the vehicle and automatically adjusting a height of the roof based upon the sensed surroundings.

Disclosed is an example actuatable roof control method that may comprise sensing surroundings of a vehicle with a sensor supported by a roof of the vehicle at a first height, evaluating performance of the sensor at the first height, and automatically moving the sensor to a second height, different than the first height, based upon the performance.

Disclosed is an example non-transitory computer-readable medium that contains instructions for directing a processor. The instructions may comprise sensing instructions for directing the processor to obtain signals from a sensor carried by a roof of a vehicle and indicating characteristics of surroundings of the vehicle, height determining instructions for directing the processor to determine a height for the roof based upon the signals, and roof actuation instructions for directing the processor to automatically output control signals causing an actuator to move the roof to the determined height.

Figure 1B:
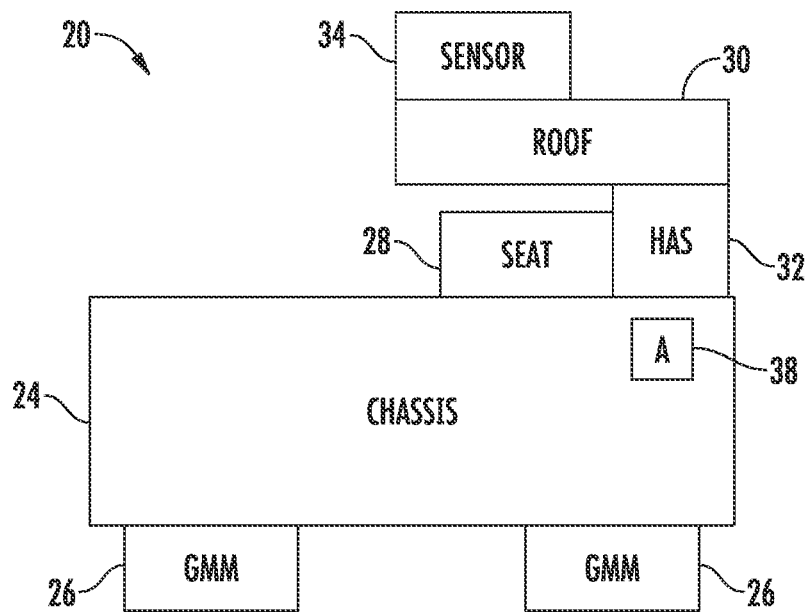

FIGS. 1A and 1B schematically illustrates an example vehicle 20 with a roof supported at two different heights. Vehicle 20 may facilitate enhanced performance of sensors supported by the roof. Vehicle 20 may facilitate lower cost transport and storage by automatically lowering the height of the roof in response to forthcoming obstructions, the sensed positioning of the vehicle on a trailer, the sensed towing of the vehicle or the sensed height of a storage facility opening or interior. Vehicle 20 comprises chassis 24, ground motive members 26, seat 28, roof 30, height adjustable support 32, sensor 34 and actuator 38.

Chassis 24 comprises a base or frame of vehicle 20. Chassis 24 may comprise a chassis of a tractor, the chassis of a harvester, the chassis of a truck, or the chassis of the other vehicle. Chassis 24 may include an internal combustion engine or an electric motor for powering ground motive members 26.

Ground motive members 26 comprise members that movably support chassis 24 above an underlying surface. In one implementation, ground motive members 26 comprise wheels. In another implementation, ground motive members 26 comprise tracks.

Seat 28 is supported by chassis 24 and is for supporting an operator on chassis 24. Seat 28 may extend adjacent to operator controls of vehicle 20.

Roof 30 extends over or above seat 28. Roof 30 protects the operator 40 resting upon seat 28 from sunlight, rain or the like. Roof 30 may additionally cover and protect operational controls of vehicle 20. Roof 30 is movably supported by height adjustable support 32.

Height adjustable support 32 movably supports roof 30 between a raised position shown in FIG. 1A and a lowered position shown in FIG. 1B. In one implementation, height adjustable support 32 supports roof 30 at a selected one of a plurality of distinct predetermined heights. In another implementation, height adjustable support 32 supports roof 30 at any of a continuum of different heights above seat 28. Height adjustable support 32 may have various forms such as telescopic tubes, a pivot, a multiple link pivot or a four bar linkage.

Sensor 34 comprises at least one sensor supported by roof 30 so as to be movable with the movement of roof 30. Sensor 34 may sense the positioning of roof 30. Sensor 34 may additionally or alternatively sense the surroundings to vehicle 20. For example, sensor 34 may output signals indicating a height of surroundings with respect to vehicle 20. In some implementations, sensor 34 may sense a height of foliage or crops proximate to vehicle 20. Examples of sensor 34 include, but are not limited to, an ocular camera, stereo cameras, time-of-flight cameras, thermal cameras, lidar, radar, sonar, initial measurement units, magnetometers, weather sensors (temperature, humidity, pressure and the like) and electromagnetic sensors (sunlight, radio and the like). In some implementations, sensor 34 may comprise a height sensor which may be in the form of an actuator encoder, mechanical travel sensor, an inertial measurement device or a roof perception sensor.

Actuator 38 comprise a device for selectively raising and lowering roof 30 so as to also selectively raise and lower sensor 34. In some implementations, actuator 38 may interact with height adjustment support 32. Examples of actuator 38 include, but are not limited to, an electric motor (rotary or linear), a hydraulic motor (cylinder motor) and a pneumatic actuator (cylinder motor).

As shown by FIGS. 1A and 1B, roof 30 and sensor 34 are movable between a raised position shown in FIG. 1A and a lower position shown in FIG. 1B. Lowering of roof 30 and sensor 34 to the lowered position may be in response to the vehicle being loaded onto a trailer for transport, in response to the height of a storage facility opening or interior being approached by the vehicle, the height of overhead trees or other structures and/or the height of surrounding foliage or crops. The lowering roof 30 may be in response to the sensed departure of an operator 40 from seat 28 and from chassis 24.

Raising of roof 30 and sensor 34 may be in response to an operator boarding or about to board vehicle 20. Raising of roof 30 and sensor 34 may be in response to the height of the surrounding foliage or crops, wherein the higher height of sensor 34 may facilitate enhanced sensing of crops by sensor 34. Such raising and lowering may be manually triggered by an operator or may be automatically triggered by a controller based upon signals received from sensor 34 or other sensors.

Figure 2:
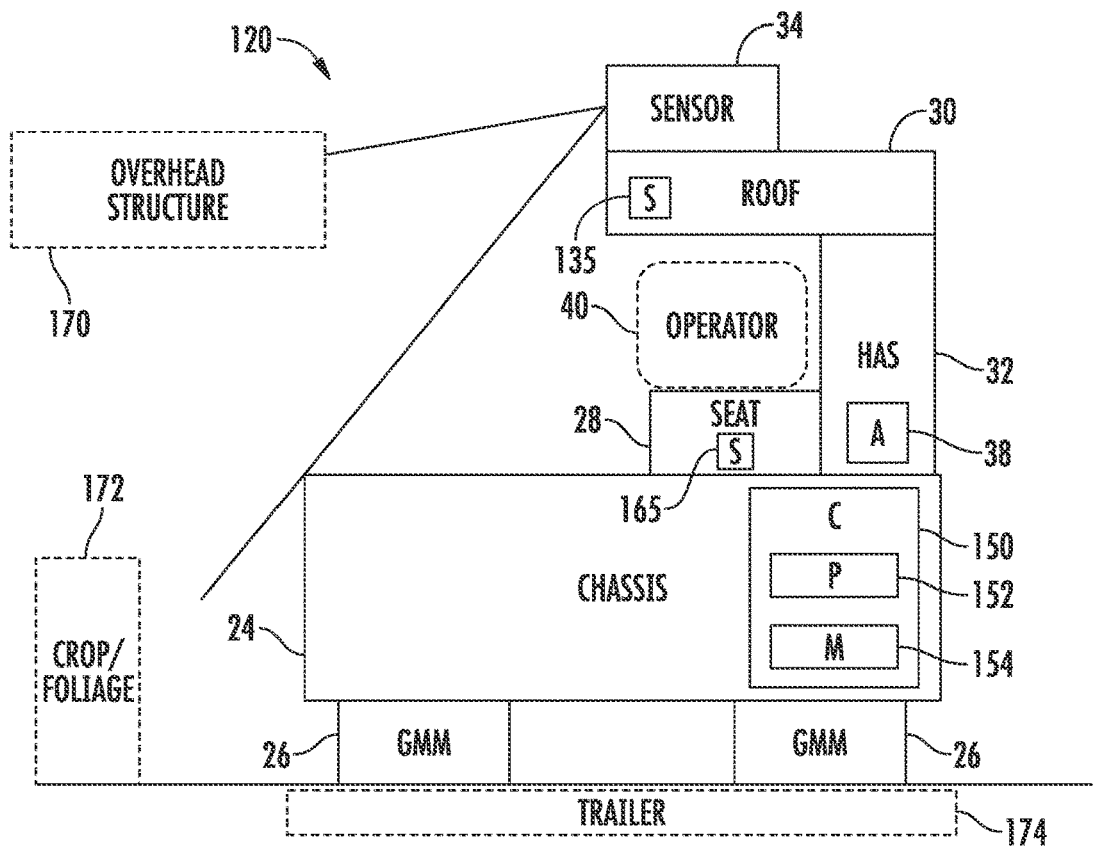
FIG. 2 is a diagram schematically illustrating portions of an example vehicle.

FIG. 2 is a schematic diagram illustrated portions of an example vehicle 120. Vehicle 120 is similar to vehicle 20 described above except that vehicle 120 additionally comprises sensor 135 and controller 150. Those remaining components of vehicle 120 corresponding components of vehicle 20 are numbered similarly.

Figure 3:
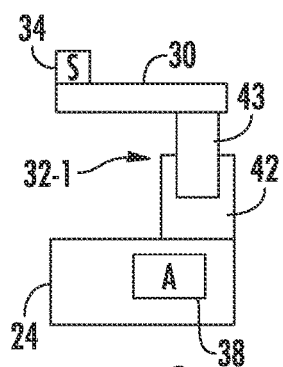
FIG. 3 is a diagram schematically illustrating portions of one example implementation of the vehicle of FIG. 2.

FIGS. 3-6 schematically illustrate various examples of height adjustable support 32, described above. FIG. 3 illustrates an implementation comprising height adjustable support 32-1 in the form of telescopic bars or tubes 42, 43. In such an implementation, tube 43 extends and retracts into and out of the larger outer tube 42 to raise and lower roof 30. In one implementation, tubes 42, 43 may be in the form of a hydraulic or pneumatic piston-cylinder arrangement, or an actuator 38 comprises valves and a source of pressurized gas or fluid to extend and retract tube 43 (in the form of a piston).

Figure 4:
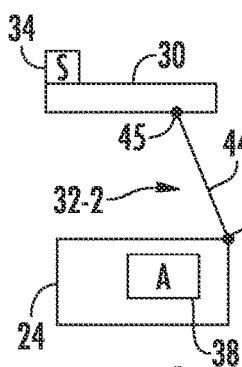
FIG. 4 is a diagram schematically illustrating portions of one example implementation of the vehicle of FIG. 2.

FIG. 4 illustrates an implementation comprising height adjustable support 32-2 in the form of a single linkage 44 having a pair of pivot points 45. In such an implementation, actuator 38 may comprise a rotary actuator to pivot linkage 44 or a linear actuator to pivot linkage 44 so as to raise or lower roof 30.

Figure 5:
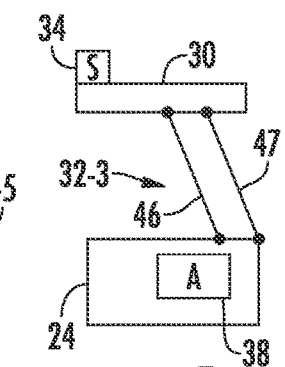
FIG. 5 is a diagram schematically illustrating portions of one example implementation of the vehicle of FIG. 2.

FIG. 5 illustrates an implementation comprising a height adjustable support 32-3 in the form of a pair of parallel linkages 46, 47 which form a four bar linkage. The four bar linkage facilitates raising and lowering roof 30 while roof 30 remains level or in a single orientation. Actuator 38 may comprise a rotary actuator or linear actuator for raising and lowering roof 30.

Figure 6:
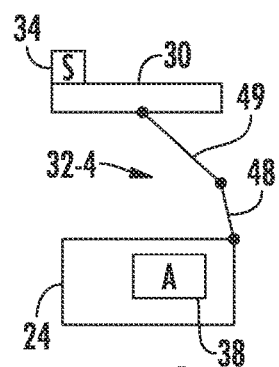
FIG. 6 is a diagram schematically illustrating portions of one example implementation of the vehicle of FIG. 2.

FIG. 6 illustrates an implementation comprising a height adjustable support 32-4 in the form of multiple, consecutively linked and pivotably connected linkages 48, 49. Actuator 38 may comprise a rotary actuator or linear actuator for pivoting links 48 and/or 49 to raise and lower roof 30.

Sensor 135 comprises a sensor that detects the current height or extension of roof 30 (and sensor 34). In some implementations, sensor 135 may comprise an actuator encoder, mechanical travel sensor, an inertial measurement device, or roof perception sensor. In some implementations, sensor 135 may be omitted, wherein controller 150 may determine the current height of roof 30 based upon the prior control signals transmitted to actuator 38. In some implementations, sensor 135 may be made aware of signals from sensor 34 which may themselves indicate a height of roof 30.

Controller 150 controls the raising and lowering of roof 30 and sensor 34. Controller 150 comprises a processor 152 and a non-transitory computer-readable medium 154. Processor 152 carries out instructions provided by medium 154. Medium 154 may be in the form of a circuit board having logic components, the form of software having coded instructions or combinations thereof.

Figure 7:
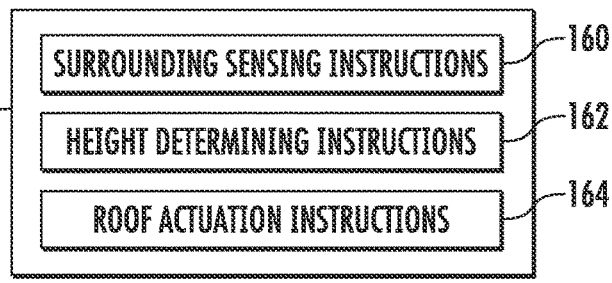
FIG. 7 is a block diagram schematically illustrating an example non-transitory computer-readable medium for the vehicle of FIG. 2.

FIG. 7 is a block diagram schematically illustrating one example of medium 154. As shown by FIG. 7, medium 154 comprises surrounding sensing instructions 160, height determining instructions 162 and roof actuation instructions 164. Surrounding sensing instructions 160 direct processor 152 to output control signals causing sensor 135 and/or sensor 34 to sense the surroundings of vehicle 120. Such surroundings may comprise the sensing of elevated or overhead structures 170, crop or foliage 172, trailer 174 and/or a different towing vehicle forward of vehicle 120.

The overhead structure 170 may comprise the opening or clearance for an overhead structure, such as an opening below an overpass or an entrance opening.

Height determining instructions 162 direct processor 152 to determine (a) the current height of roof 30 and/or (b) the height of the surroundings being sensed pursuant to block 160. Height determining instructions 162 may direct processor 152 to analyze images captured by sensor 34 or other signals from sensor 34 relative to the identified ground or other reference location to determine the height of overhead structure 170, and/or the height of the crop/foliage 172. For example, instructions 162 may cause processor 152 to determine a distance of the particular overhead structure 170 relative to a known reference surface or structure of vehicle 120 using images captured by sensor 34 to determine the height of overhead structure 170 and/or the height of the crop/foliage 172. Sensor 134 may be supported at a particular height in a particular angle, wherein edge detection analysis may be applied to images captured by sensor 34 to determine or estimate the height of overhead structure 170 and/or crop foliage 172.

Roof actuation instructions 164 direct processor 152 to output control signals causing actuator 38 to raise and lower roof 30 based upon signals from sensor 34 and/or height determinations made pursuant to instructions 162. In one implementation, roof actuation instructions 164 may direct processor 152 to identify or determine whether vehicle 120 is currently residing on trailer 174 or is being towed by a forward vehicle from the signals received from sensor 34 or other sensors. For example, trailer 174 or the forward towing vehicle may include an RFID (radio frequency) tag or some other identifying indicia indicating its presence. In some implementations, processor 152 may analyze images captured by sensor 34 so as to recognize the presence of trailer 174 and/or a towing vehicle. In response to a determination that vehicle 120 is probably residing on a trailer 174 or is currently being towed by another vehicle, as determined by processor 152, roof actuation instructions 164 may cause processor 152 to automatically output control signals to actuator 38 causing actuator 38 to lower roof 30 to a lowered or retracted state such as shown in FIG. 1B. The lowered state may reduce wind resistance and conserve fuel during the transport of vehicle 120.

In some implementations, vehicle 120 may additionally include a seat occupancy sensor 165 which senses the presence of an operator on seat 28. In such an implementation, the lowering of roof 30 may be automatically paused or terminated by controller 50 in response to signals from sensor 165 indicating the presence of an operator 40 upon seat 28.

In one implementation, roof actuation instructions 164 may cause processor 152 to output control signals causing actuator 38 to raise or lower roof 30 based upon the determined height of the surroundings of vehicle 120 as determined by controller 150 following the height determining instructions 162. In one implementation, instructions 162 may direct the processor 152 to output control signals causing actuator 38 to automatically lower roof 30 and sensor 34 by a determined extent so as to clear the sensed overhead structure 170. In one implementation, roof 30 may be lowered to a lowermost position in response to a determination that an upcoming overhead structure (ahead of vehicle 120 when vehicle 120s moving forward or behind vehicle 120 when vehicle 120 is being backed up) may impact roof 30 or sensor 34. In one implementation, roof 30 may be lowered to a height above the lowermost position, but low enough so as to clear the upcoming overhead structure. The height may be determined based upon the determine height of the overhead structure. By not lowering roof 30 and sensor 34 to the lowermost position, but just to a position sufficient to clear (extend beneath) the overhead obstacle or structure 170, time consumed during the subsequent raising of roof 30 and sensor 34 may be reduced.

In some implementations, roof actuation instructions 164 may cause processor 152 to output control signals causing actuator 38 to raise or lower roof 30 based upon the determined height of crop/foliage 172. For example, the sensing of the crop/foliage 172 may be best performed at a particular relative height of sensor 34 with respect to the particular height of the crop/foliage 172 being sensed. Raising roof 30 and sensor 34 may result in a larger area of crop/foliage 172 being sensed or may result in enhanced sensing due to a different perspective provided to sensor 34. Lowering of roof 30 and sensor 34 may result in enhanced sensing by positioning sensor 34 into closer proximity with the top of the crop/foliage 172.

Figure 8:
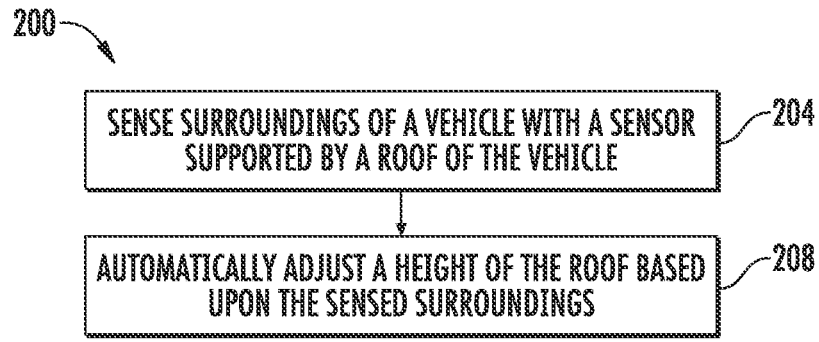
FIG. 8 is a flow diagram of an example actuatable roof control method.

FIG. 8 is a block diagram of an example actuatable roof control method 200 that may be carried out by vehicle 120 or other similar vehicles. As indicated by block 204, the surroundings of a vehicle are sensed with a sensor that is supported by a roof of the vehicle. As indicated by block 208, the height of the roof is automatically adjusted based upon the sensed surroundings. Examples of the criteria for automatically raising or lowering the roof are described above with respect to controller 150.

Figure 9:
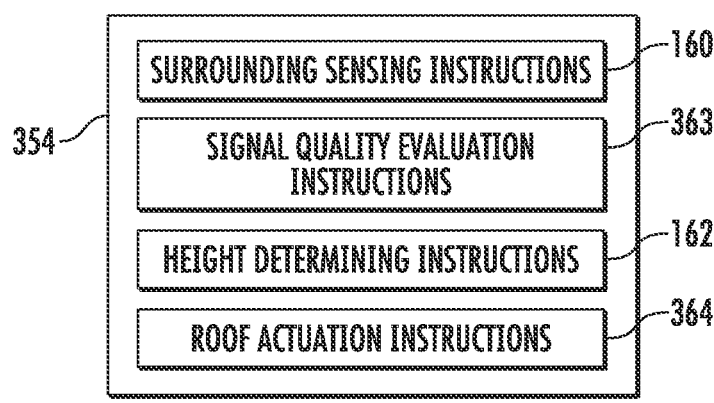
FIG. 9 is a block diagram schematically illustrating an example non-transitory computer-readable medium for the vehicle of FIG. 2.

FIG. 9 is a block diagram schematically illustrating medium 354, another example implementation of medium 154 described above. Medium 354 comprises a non-transitory computer-readable medium for directing processor 152 of vehicle 122 carry out actions. Medium 354 is similar to medium 154 except that medium 354 is operable in an additional mode in which closed-loop feedback is utilized to optimize or enhance signal quality by adjusting the height of roof 30 and sensor 34. Medium 354 additionally comprise signal quality evaluation instructions 363 and comprises roof actuation instructions 364 in place of roof actuation instructions 164. Those instructions described above with respect to medium 154 which are also found in medium 354 are numbered similarly.

Signal quality evaluation instructions 363 direct processor 152 to evaluate the performance of sensor 34. Such performance may be in the resolution of the signals received from sensor 34, the reliability of determinations made using signals from sensor 34, image quality output by sensor 34, illumination levels for capturing data by sensor 34 and the like. Such performance may include the quality of the data acquired by such sensors.

Roof actuation instructions 364 are similar to roof actuation structures 164 except that roof actuation instructions 364 include an additional set of instructions for when controller 15D is operating in a different operator selected mode in which the height of sensor 34 and roof 30 are automatically adjusted so as to optimize performance by sensor 34. Roof actuation instructions 364 cause processor 152 to output control signals adjusting the height of roof 30 and sensor 34. At each height, the performance of sensor 34 is evaluated by instructions 363. Using closed loop feedback, the height of roof 30 is iteratively adjusted until the performance of sensor 34 is within prescribed performance levels or, in some implementations, optimized. Depending upon the type of crop/foliage being sensed, lighting conditions, airborne contaminant/dust conditions, the height of the crop/foliage 172 being detected in the like, sensor 34 may perform better at different heights. Medium 354 directs processor 152 to automatically identify the best height for sensor 34 given such conditions and to automatically output control signals causing actuator 38 to locate roof 30 and sensor 34 at the particular determine height.

Figure 10:
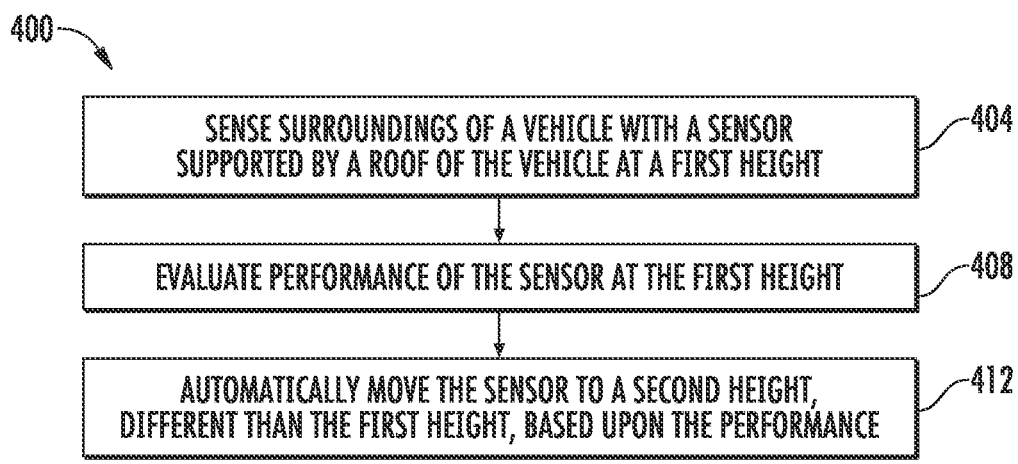
FIG. 10 is a flow diagram of an example actuatable roof control method.

FIG. 10 is a flow diagram of an example actuator where roof control method 400 that may be carried out by vehicle 120 including medium 354 as described above. As indicated by block 404, the surroundings of a vehicle are sensed with a sensor supported by a roof of the vehicle at a first height. As indicated by block 408, the performance of the sensor is evaluated at the first height. As indicated by block 412, based upon the detected performance, the sensor, supported by the roof, is automatically moved to a second height, different than the first height.

FIGS. 11A-11C illustrate portions of an example vehicle 520, portions of which are schematically represented. Vehicle 520 is in the form of a tractor. Vehicle 520 comprises chassis 524, ground motive members 526, operator seat 528, operator controls 529, roof 530, height adjustable support 532, sensors 534-1, 534-2 (schematically shown) (collectively referred to as sensors 534), actuator 38 and controller 150.

Chassis 524 comprises a framework and power source of vehicle 520. The power source may comprise an internal combustion engine, an electric motor or a combination thereof. In the example illustrated, chassis 524 further comprises a forwardly located bed 525 for carrying various items. Ground motive members 526 are illustrated as being in the form of tires. In other implementations, ground motive members 526 may comprise tracks.

Operator seat 528 is positioned below roof 530 rearward of operator controls 529. Operator controls 529 may comprise a control console supporting a steering wheel which is underlies roof 530. In some implementations, operator controls 529 may further comprise a joystick, a display screen, a touchscreen or other notification or input device.

Roof 530 covers and protects seat 528 and operator controls 529. Roof 530 is movably supported by height adjustable support 532. In the example illustrated, height adjustable support 532 comprises four telescopic bars or tubes which are movable between different extended states by actuator 38 (described above). In one implementation, actuator 38 may comprise a hydraulic or pneumatic cylinder-piston assembly. In other implementations, height adjustable support 532 and actuator 38 may have other forms as described above with respect to vehicle 20 or vehicle 120.

Sensors 534 are supported by roof 530. In one implementation, sensors 534 are integrated into roof 530. In another implementation, sensors 534 are mounted to roof 530 above or below roof 530.

Sensors 534 may be similar to sensor 34 described above. In some implementations, sensors 534 may comprise a mix of passive and active sensors. Sensors 534 may include a mix of perception and proprioception sensors. Sensors 534 may include, but are not limited to, binocular cameras, stereo cameras, time-of-flight cameras, thermal cameras, Lidar, radar, sonar, inertial measurement units, magnetometers, weather sensors (temperature, humidity, pressure etc.) electromagnetic sensors (sunlight, radio etc.) or other task specific sensors for various farming, construction or other operations.

In the example illustrated, sensor 534-1 has a field-of-view forward of vehicle 520 while sensor 534-2 has a field-of-view rearward of vehicle 520. Sensors 534 provide signals to controller 150 providing information regarding the surroundings of vehicle 520, such as the presence and height of an overhead structure 170, the characteristics of crop/foliage 172 and/or the height of foliage/crop 172. The characteristics of the crop/foliage 172 that may be detected by sensors 534 may include, but are not limited to, the population of the crop, health of the crop, density of the crop, the presence of weeds within the crop and the like.

Controller 150 is described above with respect to vehicle 120. In one implementation, controller 150 comprises medium 154. In another implementation, controller 150 comprise a medium 354. Controller 150 may output control signals to actuator 38 causing actuator 38 to move roof 530 and sensor 534 to a lowered state shown in FIG. 11B and to move roof 530 and sensor 534 to a lowered state shown in FIG. 11C. As described above, roof 530 and sensors 534 may be raised and lowered automatically by controller 150 in response to vehicle 520 being loaded upon a trailer or being towed by another vehicle as detected by sensors 534 or other sensors. Roof 530 and sensors 534 may be automatically raised and lowered by controller 150 to clear an upcoming overhead structure. Roof 530 and sensors 534 may be automatically raised and lowered by controller 150 based upon the height or characteristics of the crop/foliage. Roof 530 and sensors 534 may be automatically raised and lowered based upon a determined performance of sensors 534 such that sensors 534 are supported at a height at which sensors 534 have improved or enhanced performance. For example, roof 530 and sensors 534 may be raised or lowered to a height that offers sensors 534 with a superior field-of-view or that facilitates the sensing of tall crops. In some implementations, the adjustment of roof 530 to enhance performance of sensors 534 may be periodically carried out. For example, the adjustment of roof 530 to enhance sensor performance be carried out once per field, once per row, or continuously in real time depending upon data collection objectives.

Figure 13:
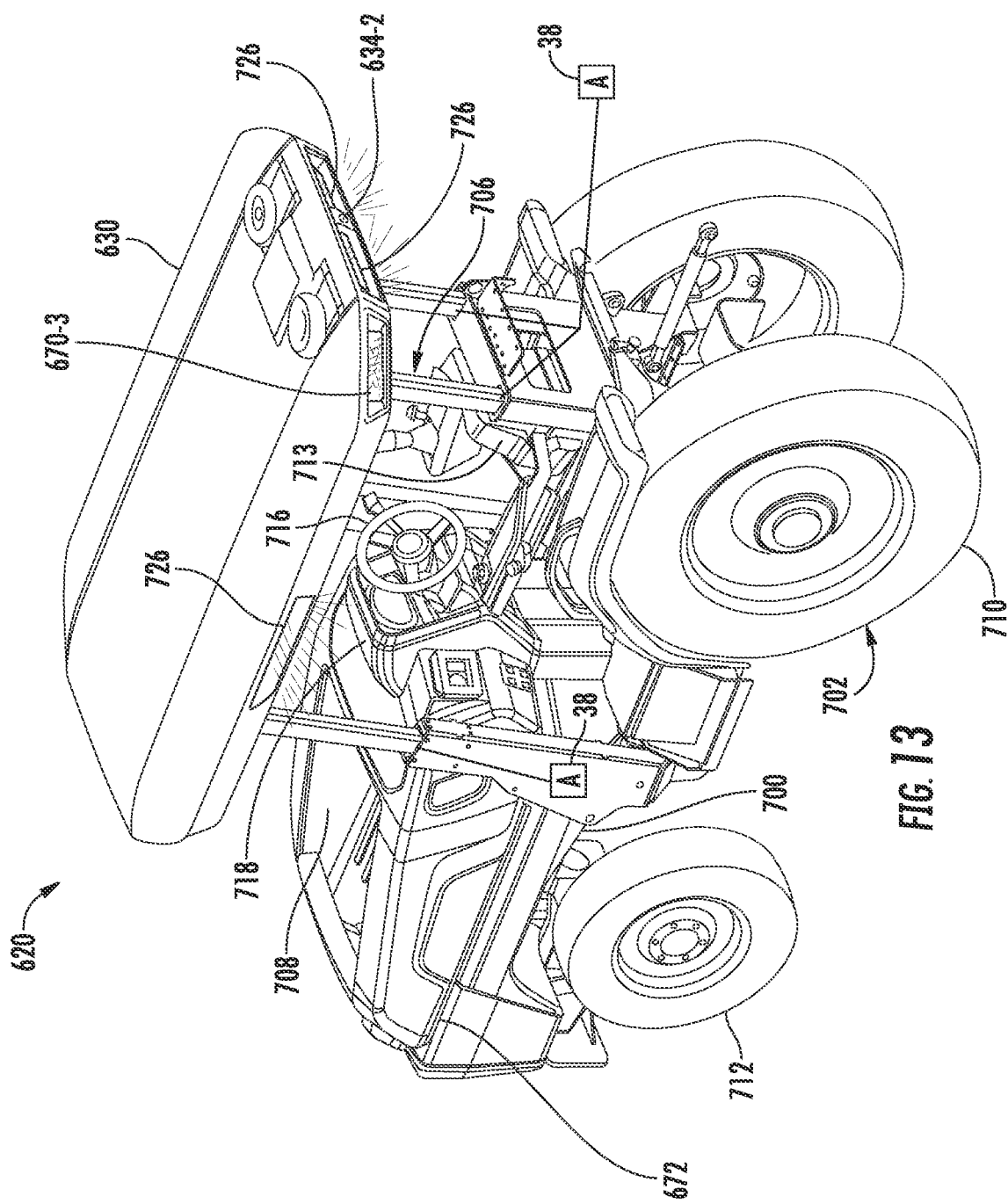
FIG. 13 is a rear perspective view of the vehicle of FIG. 12.
Figure 14:
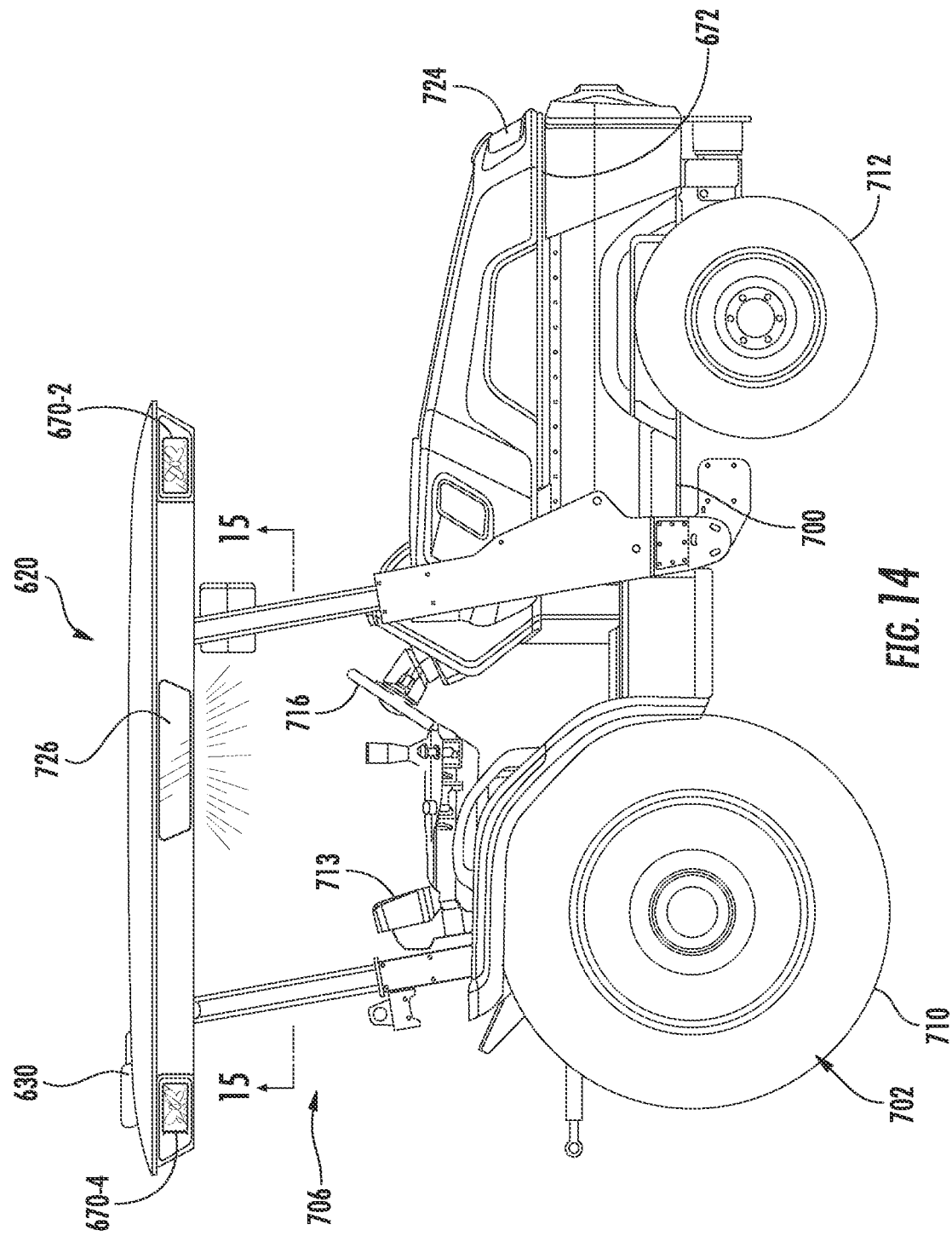
FIG. 14 is a left side view of the vehicle of FIG. 12.

FIGS. 12 and 13 are diagrams illustrating an example vehicle 620 in the form of a tractor. Vehicle 620 is similar to vehicle 520 described above except that vehicle 620 additionally provides gesture control for the positioning of roof 630 and the sensors and indicators/displays it carries. Vehicle 620 further comprises vehicle state and feedback system 622. FIGS. 12 and 13 illustrate specific examples of sensors supported by roof 630. Vehicle 620 comprises chassis 700, ground propulsion members 702, battery 704, and vehicle cab 706. Vehicle 620 further comprises lights 800, steering unit 802, propulsion unit 804, power take-off (PTO) unit 806, hydraulic power unit 808, brakes 810 and auxiliary units 812.

Chassis 700 comprises a frame supporting the remaining components of vehicle 620. In the example illustrated, chassis 700 comprises a front cargo bed 708 for storing and transporting cargo. In the example illustrated, chassis 700 is further configured for connection to an attachment/implement 625. In the example illustrated, propulsion unit 804 comprises an electric motor driven by electrical power supplied by a battery.

Ground propulsion members 702 comprise members that engage the underlying terrain and which are driven by propulsion unit 804. In the example illustrated, ground propulsion members 702 comprise rear wheels 710 and front wheels 712. In the example illustrated, rear wheels 710 are driven by propulsion unit 804 while front wheels 712 are manipulated or turned by steering unit 802. In other implementations, ground propulsion members 702 may comprise tracks or other ground engaging members.

Battery 704 comprises a battery unit that is removably received within a corresponding chamber or cavity extending rearwardly from the front of chassis 700. Battery 704 mates with a corresponding connection interface for transferring electrical power from battery 704 to the electrically powered components of vehicle 620. In other implementations, battery 704 may be located at other locations. In other implementations, battery 704 may be fixed and non-swappable or not removable. In the example illustrated, battery 704 electrically powers propulsion unit 804 which drives rear wheels 710. In the example illustrated, battery 704 electrically powers hydraulic motors or pumps of hydraulic power unit 808, steering unit 802 and brakes 810. Battery 704 additionally powers lights 800, attachment/implement 625, and auxiliary units 812.

Cab 706 comprises a compartment in which an operator may be seated when operating vehicle 620. Cab 706 comprises a seat 713, a steering wheel 716, a control console 718, and a roof 630. Roof 630 extends over seat 713 and control console 718. Roof 630 is movably supported by height adjustable support 532 (described above). In the example illustrated, height adjustable support 532 comprises four telescopic bars or tubes which are movable between different extended states by actuator 38 (described above). In one implementation, actuator 38 may comprise a hydraulic or pneumatic cylinder-piston assembly. In other implementations, height adjustable support 532 and actuator 38 may have other forms as described above with respect to vehicle 20 or vehicle 120.

Lights 800 comprise lights supported by vehicle 620 for providing illumination about vehicle 620 or for providing alerts or notifications for vehicle 620. Steering unit 802 comprises electrical and/or hydraulic components and associated controllers that effectuate turning of the wheels, tracks, or the like to steer forward or rearward travel of vehicle 620. Propulsion unit 804 comprises an internal combustion engine, electric motor, transmission, and associated controllers for controlling the forward and rearward propulsion of vehicle 620. PTO unit 806 comprises an electrical, hydraulic, or mechanical drive and associate controllers for rotating the power take off (such as a projecting spline) for supplying torque to a fitting associated with an attachment or implement. Hydraulic power unit 808 comprises hydraulic pumps, valves, and associated controllers for supplying pressurized hydraulic fluid to portions of vehicle 620 or to attachments/implements powered by such pressurized hydraulic fluid from vehicle 620. Brakes 810 comprise devices for braking, slowing down the propulsion of vehicle 620. Auxiliary units 312 comprise movable or actuator components of vehicle 620, such as in circumstances where vehicle 620 is not a tractor, but another vehicle such as a harvester. For example, auxiliary units 312 may comprise discharge spouts of a harvester, wherein the positioning of the discharge spout and/or the rotation of an auger of the discharge spout are adjustable.

Attachment/implement 625 comprises an attachment carried by vehicle 620 and/or an implement being pushed or pulled by vehicle 620. An attachment may be in the form of a bucket, blade, harvester head or the like. Examples of an implement may include any of a variety of implement such as wagons, carts, plows, discs, choppers, balers, sprayers, and the like. As discussed above, vehicle actions may involve repositioning such attachments or implements or adjusting the supply of power to such attachments or implements.

As with vehicle 520, vehicle 620 includes sensors that are supported and carried by a height adjustable roof. In the example illustrated, such sensors comprise cameras 634-1 (shown in FIG. 12), 634-2 (shown in FIG. 13) and 634-3 (shown in FIG. 15) (collectively referred to as cameras 634). Cameras 634 capture images of operator control gestures as well as the surrounding environment and output signals to processor 652. Camera 634-1 extends on a front edge of roof 630 to capture regions in front of vehicle 620. Camera 634-2 extends on a rear edge of roof 630 to capture images of regions rearward of vehicle 620. Cameras 634-3 extend on underside of roof 630 to capture side regions of vehicle 620.

Camera 634 capture images that are analyzed by processor 652 using optical recognition techniques such as segmentation and the like to distinguish objects, their positioning relative to vehicle 620, and their operational states. As discussed above with respect to sensors 534 provide signals to processor 652 providing information regarding the surroundings of vehicle 620, such as the presence and height of an overhead structure 170, the characteristics of crop/foliage 172 and/or the height of foliage/crop 172. The characteristics of the crop/foliage 172 that may be detected by sensors 534 may include, but are not limited to, the population of the crop, health of the crop, density of the crop, the presence of weeds within the crop and the like. As will be described hereafter, camera 634 may further capture images and output signals identifying the positioning of an operator as well as input gestures from and by the operator. In some implementations, camera 634 may comprise a mix of perception and proprioception sensors. Camera 634 may include, but are not limited to, binocular cameras, stereo cameras, time-of-flight cameras, and thermal cameras. In some implementations, vehicle 620 may include additional or fewer cameras at the same or different locations and alternative forms of sensors. For example, in some implementations, vehicle 620 may include additional or other types of sensors supported by roof 630 such as Lidar, radar, sonar, inertial measurement units, magnetometers, weather sensors (temperature, humidity, pressure etc.) electromagnetic sensors (sunlight, radio etc.) or other task specific sensors for various farming, construction or other operations.

Signals from camera 634 may be further utilized to sense a height of roof 630. In some implementations, the height of roof 630 may be determined by processor 652 using signals from other sensors that sense a state of height adjustable support 532. In some implementations, the height of roof 630 may be determined by processor 652 based upon the state of actuator 38. For example, the degree of extension of a hydraulic are pneumatic cylinder-piston assembly may also indicate the height of roof 630. In some implementations, the height of roof 630 may be sensed or determined from an actuator encoder, a mechanical travel sensor, and inertial measurement device and a roof perception sensor Processor 652 utilizes data are information provided by camera 634 (and any other sensors supported by roof 630) to automatically control operations of vehicle 620 and/or attachment/implement 625. In some implementations, processor 652 utilizes the information from camera 634 (and any other sensors supported by roof 630) to operate vehicle 620 and/or attachment/implement 625 in an autonomous manner, without human intervention or real-time input. In some implementations, vehicle 620 facilitates remote operator control, control of vehicle 620 and/or attachment/implement 625 by an operator not residing in cab 706 or not riding vehicle 620. For example, vehicle 620 and/or attachment/implement 625 may be remotely controlled by an operator walking alongside, behind or in front of vehicle 620. In some implementations, control inputs may be provided to vehicle 620 and/or attachment/implement 625 using wireless signals transmitted from a portable electronic device carried by the remote operator, such as a smart phone, computer notebook, computer pad or other device capable of transmitting wireless signals.

In the illustrated example, vehicle 620 is configured to facilitate remote operator control, control from an operator walking alongside, behind or in front of vehicle 620. In the example illustrated, vehicle 620 additionally comprises vehicle state and feedback system 722. Vehicle state and feedback system 722 comprises indicators 670-1, 670-2, 670-3, 670-4 (collectively referred to as indicators 670), indicator 672, indicator 674, and state/feedback instructions 676. Indicators 670 comprise display screens located at the four corners of roof 630. Indicators 670-1 and 670-2 face in a forward direction and are angled towards their respective opposite sides of vehicle 620. Indicators 670-3 and 670-4 face in a rearward direction and are angled towards their respective opposite sides of vehicle 620. Indicators 670 present graphics and text which may be viewed by the operator 642 at various positions about vehicle 620.

Indicator 572 comprises an elongate bar or strip that wraps around a front of the hood 601 and the sides of hood 601 of vehicle 620, wherein the bar or strip may be selectively illuminated under the control of processor 652. In some implementations, indicator 572 is actuated between an illuminated and a non-illuminated state to provide feedback to the operator 642 who may be remote from vehicle 620, not within cab 706. In some implementations, indicator 572 was actuatable between different colors or shades of colors to provide status information to operator 642. In some implementations, indicator 572 is actuatable between different brightness levels or is actuatable so as to flash or flash at different frequencies to provide status information to the remote operator 642.

Indicators 674 comprise speakers/microphones. In the example illustrated, indicators 674 are located on underside of roof 630 proximate steering console 718. Indicators 674 provide audible status information to an operator remote from vehicle 620. In some implementations in which indicators 674 also serve as microphones, indicators 674 may serve as input devices for the remote operator, whereby the operator may provide audible instructions or commands and wherein processor 652 uses speech recognition to identify such commands and carry out such commands.

In some implementations, lights 726 may serve as additional indicators, wherein a color, brightness, blinking frequency, or the like of such lights 726 may be controlled to provide status information to the operator 642. In some implementations, additional visible indicators, such as light emitting diode lights, light bars or the like may be utilized to provide status information based upon the current state of vehicle 620, its implements 625, its components 800, 802, 804, 806, 808, 810, 812 and/or the positioning of operator 642 or the positioning of implement 625 as based upon images captured by cameras 634.

State/feedback instructions 676 comprise software, code or logic elements on a circuit board provided in the non-transitory computer-readable medium 654. Instructions 568 direct processor 652 to output various control signals controlling the actuation or state of indicators 670, 572 and 674. For example, processor 652, following instructions 568, may indicate a first state of vehicle 620 by providing indicator 672 with a first brightness, color, on/off state and/or blinking frequency and may indicate a second different state of vehicle 620 by providing indicator 672 with a second different brightness, color, on/off state and/or blinking frequency. For example, indicator 672 may be illuminated to have a green color when traveling forward and illuminated to have a red color when stopped. By way of another example, indicator 572 may be illuminated to have a green color when the power takeoff is operating or when an implement is being powered and may have a red color when the power takeoff is no longer operating or when an implement is no longer being powered or driven.

Processor 652, following instructions 568, may indicate a first state of vehicle 620 or second state of vehicle 620 by displaying graphics or text on one or multiples of indicators 670. Such status information provided by indicators 670, 572, and 674 may include the speed or rate at which the vehicle is traveling, the speed or state of an implement and/or the state of any of lights 800, steering unit 802, propulsion unit 804, PTO unit 806, brakes 810 and/or auxiliary units 812. Such feedback or status information provided by indicators 670, 572 and 574 may include a confirmation of receipt or capture of gestures from the operator (either operator anatomy 644 and/or input device 648), a confirmation of recognition of such gestures, an indication that such commands are about to be executed, a request for the operator to repeat such gestures or to move so as to be more centrally located within the field of view of cameras 634 when providing such gestures, or an indication that the commands associated with such gestures will not be carried out given the current state of vehicle 620 or the operator's position relative to vehicle 620 and/or its implements. Different indicators may be utilized to provide different types of status information to the operator.

In one implementation, processor 652, following instructions contained in medium 654, utilizes images from camera 634-1 to identify the positioning of rows of plants and to output control signals to steering unit 802 and propulsion unit 804 to automatically drive vehicle 620 (and any attachment/implement 625) between and along the rows of plants (such as crop plants, trees and the like). In one implementation, processor 652, following instructions contained in medium 654, utilizes images from camera 634-1 to identify the positioning or location of operator 642 and the movement of operator 642. Processor 652, following the instructions contained in medium 654, may further block or allow other commands from operator 642 (based upon input gestures) based upon the position or movement of operator 642. In some implementations, processor 652, following instructions contained in medium 654, may output control signals causing propulsion unit 804 and steering unit 802 to move vehicle 620 so as to follow the movement of operator 642 at a preselected or operator selected distance. In some implementations, processor 652 may control propulsion unit 804 and brakes 810 to substantially match the speed at which the operator is moving. In some implementations, processor 652, following instructions contained in medium 654, may utilize images captured by any of cameras 634 to identify animals or other obstructions, wherein processor 652 outputs control signals to steering unit 802 and propulsion unit 804 to control the movement of vehicle 620 so as to avoid such animals or obstructions. In some implementations, processor 652 may utilizes signals from any of cameras 634 to control the lighting provided by lights 624, 626. In some implementations, processor 652 may utilize the signals from any of cameras 634 and additional signals from a provided global positioning system to automatically, without operator intervention, drive vehicle 620 to and from a worksite or field, to or from a storage lot, shed, garage or the like (a home location) for vehicle 620 or to or from a charging site or location for charging battery 704.

In some implementations, processor 652 may utilize the identified positioning of operator 642 or of animals or other obstructions so as to control brakes 810, PTO unit 806, auxiliary units 812 or attachment/implement 625. For example, in one circumstance, the attachment/implement 625 may comprise a sprayer spraying herbicides, insecticides, fungicides or the like. In response to the detection of the presence of an operator or animal, processor 652 may temporarily cease the movement of vehicle 620 and/or the spraying operation until the operator or animal is a predefined distance from the vehicle 620 or its implement 625. In some implementations, processor 652 may automatically cease the operation of power take off 623 in response to images from cameras 634 indicating that the operator, another person, or an animal are within a predefined distance from the power take off 623. In some implementations, processor 652, following instructions contained in medium 654, may utilize images captured by any of cameras 634 (plus any other sensors divided on vehicle 620) to control the actuation of an attachment/implement 625. For example, processor 652 may identify the various locations of feed troughs and may control the actuation of an auger or other device of a pulled or attached implement 625 to unload feed at particular times and locations into the feed troughs. As a result, processor 652 facilitates the automation of tasks.

In some implementations, indicators 670 or 672 may provide information to an operator 642 in circumstances where the operator's current identified position would prevent him or her from viewing or determining such information. For example, an operator positioned at the front of vehicle 620 may be fired with information on indicators 670-1 or 670-2 about the state of an implement 625 at the rear of vehicle 620. An operator positioned at the rear of vehicle 620 or at one side of vehicle 620 may be provided with status information on selected indicators 670 about the state of an implement, another operator or environment at the front of vehicle 620 or at the other side of vehicle 620. As a result, vehicle 620 provides an operator remote from vehicle 620 with information that may not otherwise be viewable given the operator's current position relative to vehicle 620.

In the example illustrated, vehicle 620 facilitates the control of vehicle 620 and/or attachment/implement 625 based upon input gestures from a remote operator 642 (standing alongside, behind or in front of vehicle 620). Cameras 634 capture images or video of such gestures and interpret such gestures as particular input commands and/or requests for information to be provided by indicator 670. The association of particular gestures to particular inputs/commands may vary depending upon what particular attachment implement is coupled to vehicle 620 and/or the current state of the particular attachment or implement coupled to vehicle 620. The same direct or indirect gesture may be associated with different commands depending upon the particular attachment or implement coupled to vehicle 620 and/or the current state of the particular attachment or implement coupled to vehicle 620. For example, in some implementations, images from cameras 634 may be used by processor 652 to identify the particular attachment or implement 625 coupled to vehicle 620, wherein processor 652 will interpret the same input gestures differently depending upon the identified attachment or implement 625 coupled to vehicle 620.

The direct gestures provided by operator 642 may be provided by the operator's anatomy 644, such as a movement or positioning of the operator's hands, fingers, legs, torso, or the like. The movement, positioning/orientation of the operator's anatomy 644 may serve as input 646 which is sensed by at least one of cameras 634. Indirect gestures initiated by operator 642 may involve the movement and/or positioning of an input device 648 which serves as input 646. The input device 648 may comprise a flag, a baton, a smart phone or other handheld or portable physical structure that may be manually manipulated by the operator 642 and that is recognizable by cameras 634.

In the example illustrated, input device 648 comprises a handheld device to be manually manipulated, moved, or positioned by operator 642. Input device 648 comprises a first face 830 having an input identifier 832. Input identifier 832 is recognizable by a camera 634 and processor 652 following input recognition instructions 58. In some implementations, input identifier 832 may comprise flashing lights, particular patterns or shades of the color or other characteristics readily perceptible by cameras 634 to facilitate the sensing of the positioning and/or movement of input device 648.

Input device 648 additionally comprises a second opposite face 834 having a display 836. In one implementation, signals from a camera 634 may be transmitted to input device 648, wherein a depiction of the region surrounding vehicle 620, based upon such signals, is presented on display 836. The captured images may be transmitted to input device 648 and presented on display 836. As a result, the operator 642 providing remote commands to vehicle 620 may make such gestures and provide such commands based upon not only on his or her perspective which is remote from vehicle 620 but also based upon the perspective of the camera 634 or taken from the perspective of vehicle 620. Thus, the operator may make a more informed decisions regarding such remote commands. In one implementation, input device 648 may comprise a smart phone that wirelessly communicates with the controller provided by processor 652 and medium 654, wherein the positioning or movement of the smart phone serves as a remote gesture for providing remote commands to vehicle 620.

To carry out such gesture recognition, additionally comprises or is in wireless communication input-action store 814, authorization store 816, operator identification and authorization instructions 818, input device identification and authorization instructions 820, remote operator input sensing instructions 822, input recognition instructions 824, operator position identification instructions 826, and input response control instructions 828.

Input-action store 814 comprises one or more databases or lookup tables linking various sensed gestures (direct or indirect) to associated requests or commands for vehicle actions.

Authorization store 816 comprises one or more databases or lookup tables identifying preauthorized operators and/or preauthorized input devices 648 for providing gestures for inputting requests or commands for vehicle actions. For example, authorization store 816 may comprise photographs of authorized operators 642, wherein authorization of an operator may be determined by comparing captured images of a candidate operator 642 and the photographs contained in the store 816. Authorization store 816 may comprise a pre-assigned set of passwords, wherein authorization for an operator 642 or an input device 648 may be determined by comparing a received password input through indicator 674 to the authorization store 816. Authorization store 816 may comprise barcode values or other signatures for authorize input devices 248. Input-action store 814 and authorization store 816 may be contained on medium 654 carried by vehicle 620 or may be stored in a remote memory or server, wherein vehicle 620 accesses stores 814, 816 through a wireless communication connection with the remote memory or server.

Operator identification and authorization instructions 818 comprise instructions for directing processor 652 to identify and authorize a candidate operator 642 for providing direct gestures for providing remote control commands for vehicle 620. Instructions 818 may direct at least one of cameras 634 or an alternative sensor, to capture images of operator 642 and then compare the received information or data to information found in authorization store 816. Based on such comparison, the operator 642 may be authorized for providing direct gestures for use in remotely controlling vehicle 620.

Input device identification and authorization instructions 820 comprise instructions for directing processor 652 to identify and authorize a candidate input device 648 providing direct gestures for providing remote control commands for vehicle 620. Instructions 820 may direct a camera 634 or an alternative sensor, to capture images a barcode or other indicia of input device 648, or to receive an identification/authorization signal from input device 648, and then compare the received information or data to information found in authorization store 816. Based on such comparison, the input device 648 may be authorized for providing indirect gestures for use in remotely controlling vehicle 620.

Operator position identification instructions 826 comprise instructions that direct processor 652 to identify the positioning of the remote operator 642 relative to vehicle 620. Based upon the determined relative positioning, such instructions may further direct processor 652 to either outputting notification to the operator 642 recommending that the operator move relative to the vehicle or automatically interrupt the requested vehicle action corresponding to the sensed operator input/gesture. In such a fashion, instructions 826 may prevent vehicle actions from being carried out when the operator may be too close or out of position with respect to vehicle 620 for the vehicle action being requested.

Input response control instructions 828 comprise instructions configured to output control signals to various actuators or the like of vehicle 620 to cause vehicle 620 to carry out the particular vehicle action corresponding to the sensed input as determined by instructions 828. Examples of various vehicle actions that may be associated with particular gestures (direct or indirect) from operator 642 in which may be carried out in response thereto include, but are not limited to vehicle actions consisting of: forward velocity, backward velocity, left/right direction, braking, lights (nightlights, running lights, spotlights), signal, sound (horn, loudspeaker), warning (flashing lights, hazard lights), implement specific actions (left sprayer on/off, right sprayer on/off, left implement wing raising and lowering, right implement wing raising and lowering, power take-up, moving a discharge spout, changing operational speed of the auger of a discharge spout, turning on/off of a power take off, adjusting a speed of the power takeoff, raising/lowering an attachment to the vehicle (such as a bucket, fork or the like), adjusting the supply of hydraulic fluid or hydraulic power to implement or attachment, raising/lowering a three point hitch in the like.

In the example illustrated, vehicle 620 facilitates remote operator control over the height of roof 630 as well as the height of cameras 634, lights 726 and indicators 670. A remote operator may provide input 646 in the form of gestures which are captured by cameras 634 in which are recognized by processor 652, wherein the input 646 causes actuators 38 to raise or lower roof 630. As a result, roof 630 may be raised or lowered by a remote operator 642 to reposition camera 634 for enhanced image capture based upon varying crop and environment conditions. Roof 630 may be raised or lowered by remote operator 642 to alter the positioning of lights 726 to vary illumination of regions around vehicle 620. Roof 630 may be raised or lowered by remote operator 642 to vary the height of indicators 670 to facilitate better viewing by the operator. In some implementations, processor 652 may automatically raise or lower roof 630 based upon the relative location of operator 642 to vehicle 620 as determined from images captured by cameras 634.

As schematically shown in FIG. 12, in some implementations, each of cameras 634 may have an associated actuator 817 which may reorient the focal point or aim of the associated camera 634. In such implementations, and operator 642 may provide input 646 in the form of gestures which are recognized by processor 652 in which cause processor 652 to output control signals causing actuator 817 to reorient a selected one or multiples of cameras 634. As a result, an operator may control the field of view of the individual camera 634. In some implementations, control over the field-of-view of cameras 634 may be adjusted in other fashions such as by an operator within cab 706 or a remote operator using a remote portable electronic device or other remote control. In some implementations, the orientation of a camera 634 may be automatically adjusted by processor 652 (following instructions contained in medium 654) based upon prior data acquired by camera 634, based upon an existing operational state of the various components 800, 802, 804, 806, 808, 810, 812 of vehicle 620, based upon an existing operational state of attachment/implement 625 and/or based upon a newly received input 646 or command that is to be carried out regarding an operational state of at least one of the various components 800, 802, 804, 806, 808, 810, 812 of vehicle 620.

In some implementations, the state of indicators 670 and camera 634 may be further automatically adjusted based upon information sensed by cameras 634 or other sensors carried by roof 630. For example, images from camera 634 may be utilized to determine a level of ambient lighting. In other implementations other types of sensors may be supported by roof 630 or other portions of vehicle 620 sensing the degree of ambient lighting (different ambient lighting such as late in the day, middle of the day, at night). Based upon the determined level of ambient lighting, the brightness of indicators 670 may be automatically adjusted. Based upon the determined ambient lighting, operational characteristics of camera 634 may be automatically adjusted.

Overall, each of the above vehicles 20, 120, 520 and 620 may provide a roof having a lower profile enabling the vehicle to be moved inside of a smaller more efficient truck or vehicle. When carried on a trailer, the lower roof height may reduce aerodynamic drag and the risk of collision with overhead obstacles. The use of the sensors supported by the roofs enable storage of the vehicle in a low height garage, shed or barn while not compromising sensor functionality during storage. When operating without a driver, such roof height adjustment may facilitate automatic adjustment to optimize field-of-view and avoid occlusions caused by foliage. The height adjustment may also enable the same vehicle to see over tall crops, like corn, while maneuvering under overhang obstacles, like tree branches, or in vineyards.

The example vehicles may provide cost-effective, efficient and environmentally friendly transportation and storage of a vehicle that utilizes both rollover protection systems and roof mounted sensors. The example vehicles facilitate the acquisition of sensor data in fields with a minimum set of sensors despite the presence of occluding foliage and growing plants which may change in height. The example vehicles may provide the ability to operate in proximity to both overhead obstacles and tall obstructions without the use of separate dedicated pieces of equipment.

The example vehicles provide the following particular advantages:
1. Reduced sensor count and cost through intelligent adjustment of sensor height.
2. Increased options for and efficiency of transport.
3. Increased options for storage in enclosed spaces with low roof heights, while not compromising sensor field of view or performance.
4. Greater operational domains for a single hardware configuration.
5. When in the low roof height configuration, personnel working in proximity to the vehicle are provided with a distinct visual indicators or autonomous operations, to likely increase safety and situational awareness for these personnel.
6. Improved value and relevance of data collected by the sensors, particularly perception sensors, via automatic adjustment of roof height based on processing of the acquired perception data.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle comprising:
a chassis;
ground motive members supporting the chassis;
a seat;
an operator cab comprising a roof over and above the seat;
a height adjustable support supporting the roof;
a sensor supported by the roof to sense structural surroundings about the vehicle; and
an actuator for selectively raising and lowering the roof based upon the sensed structural surroundings,
wherein the sensor comprises a camera and wherein the vehicle comprises a controller, the controller configured to output control signals causing the actuator to move the roof and the supported camera between a first height and a second height different than the first height, wherein the controller is further configured to cause the camera to capture a first image with the camera at the first height and a second image with the camera at the second height.

2. The vehicle of claim 1 further comprising a controller to determine a height of the roof based on signals from the sensor supported by the roof.

3. The vehicle of claim 1 further comprising a controller, wherein the structural surroundings comprise foliage or crops arranged in rows on opposite transverse sides of the vehicle, wherein the sensor is configured to output signals indicating a height of the foliage or crops on the opposite transverse sides of the vehicle and wherein the controller is configured to control the actuator to adjust the height of the roof and the supported sensor based upon the height of the foliage or crops as determined by the controller based upon the signals.

4. The vehicle of claim 1, wherein the structural surroundings comprise foliage or crops and wherein the controller is configured to determine a height of the foliage or crops based upon the signals and to automatically lower the roof towards tops of the foliage or crops, moving the sensor into closer proximity to the tops of the foliage or crops, based on the height of the foliage or crops as determined from the signals.

5. The vehicle of claim 1, wherein the structural surroundings comprise foliage or crops and wherein the controller is configured to determine a height of the foliage or crops based on the signals and to automatically raise the roof further away from tops of the foliage or crops based on the height of the foliage or crops as determined from the signals, moving the sensor away from the tops of the foliage or crops to provide the sensor with a perspective over the foliage or crops.

6. The vehicle of claim 1 further comprising a controller, wherein the controller is to automatically control the actuator to iteratively adjust the height of the roof based upon signal quality from the sensor.

7. The vehicle of claim 1, wherein the height adjustable support is selected from a group of height adjustable supports consisting of: telescopic tubes, a pivot, a multiple link pivot, and a four-bar linkage.

8. The vehicle of claim 1 further comprising a height sensor selected from a group of height sensors consisting of: an actuator encoder, a mechanical travel sensor, an inertial measurement device and a roof perception sensor.

9. The vehicle of claim 1, wherein the sensor comprises a sensor selected from a group of sensors consisting of: an ocular camera, stereo cameras, time-of-flight cameras, thermal cameras, lidar, radar, sonar, initial measurement units, magnetometers, weather sensors, and electromagnetic sensors.

10. The vehicle of claim 1, the actuator comprises an actuator selected from a group of actuators consisting of: an electric motor, a hydraulic motor, and a pneumatic actuator.

11. The vehicle of claim 1, wherein the sensor comprises a camera.

12. The vehicle of claim 1, wherein the sensor is supported and configured to sense structural surroundings comprising foliage about the vehicle or an upcoming overhead structure.

13. The vehicle of claim 1, wherein the structural surroundings comprises a trailer and a relative position of the trailer to the vehicle, vehicle further comprising a controller, wherein controller is configured to cause the actuator to automatically lower the roof in response to the signals indicating presence of the vehicle on the trailer.

14. The vehicle of claim 1, wherein the sensor extends along an underside of the roof.

15. The vehicle of claim 1 further comprising:
a processor; and a non-transitory computer-readable medium containing instructions for directing the processor to:
determine a height for the roof based on the signals from the sensor supported by the roof; and
automatically output control signals to cause the actuator to move the roof to the determined height.

16. The vehicle of claim 15 further comprising an operator cab comprising the roof, wherein the sensor is configured and supported by the roof to output signals indicating characteristics of crops or foliage having a height less than the roof and wherein the instructions are configured to direct the processor to determine the height for the roof for enhanced sensing of the crops or foliage based on the signals from the sensor.

17. A vehicle comprising:
a chassis;
ground motive members supporting the chassis;
a seat;
a roof above the seat;
a height adjustable support supporting the roof;
a sensor supported by the roof; and
an actuator for selectively raising and lowering the roof;
a processor; and
a non-transitory computer-readable medium containing instruction to direct the processor, the instructions comprising:
remote operator input sensing instructions to obtain a sensed input sensed by the sensor supported by the roof from an operator remote from the vehicle;
input recognition instructions to recognize and associate the sensed input with a vehicle action; and
input response control instructions to output control signals to the vehicle to cause the vehicle to carry out the vehicle action.

18. The vehicle of claim 17, wherein the vehicle action comprises raising or lowering of the roof.

19. The vehicle of claim 17 further comprising an operator cab comprising the roof, wherein the roof extends over the seat.

20. A vehicle comprising:
a chassis;
ground motive members supporting the chassis;
a seat;
a roof above the seat;
a height adjustable support supporting the roof;
a sensor to output signals indicating presence of the vehicle on a trailer;
an actuator for selectively raising and lowering the roof;
a controller configured to cause the actuator to automatically lower the roof in response to the signals indicating presence of the vehicle on the trailer.

21. A vehicle comprising:
a chassis;
ground motive members supporting the chassis;
a seat;
a roof above the seat;
a height adjustable support supporting the roof;
a sensor supported by the roof to sense structural surroundings about the vehicle; and
an actuator for selectively raising and lowering the roof based upon the sensed structural surroundings,
wherein the structural surroundings comprise foliage or crops and wherein the controller is configured to determine a height of the foliage or crops based on the signals and to automatically raise the roof further away from tops of the foliage or crops based on the height of the foliage or crops as determined from the signals, moving the sensor away from the tops of the foliage or crops to provide the sensor with a perspective over the foliage or crops.

* * * * *